United States Patent
Suzuki et al.

(10) Patent No.: US 10,436,329 B2
(45) Date of Patent: Oct. 8, 2019

(54) VALVE HAVING A STEM SPACED AWAY FROM A VALVE SEAT AND CONFIGURED TO ROTATE AROUND AN AXIS PARALLEL WITH AN OPENING SURFACE OF THE VALVE SEAT

(71) Applicant: IHARA SCIENCE CORPORATION, Minato-ku, Tokyo (JP)

(72) Inventors: Toshimitsu Suzuki, Tokyo (JP); Masaji Nagao, Tokyo (JP)

(73) Assignee: IHARA SCIENCE CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/764,452

(22) PCT Filed: Sep. 16, 2016

(86) PCT No.: PCT/JP2016/077510
§ 371 (c)(1),
(2) Date: Mar. 29, 2018

(87) PCT Pub. No.: WO2017/061259
PCT Pub. Date: Apr. 13, 2017

(65) Prior Publication Data
US 2018/0274683 A1    Sep. 27, 2018

(30) Foreign Application Priority Data

Oct. 5, 2015 (JP) .................................. 2015-005023

(51) Int. Cl.
*F16K 1/24* (2006.01)
*F16K 31/53* (2006.01)
(Continued)

(52) U.S. Cl.
CPC .................. *F16K 1/24* (2013.01); *F16K 1/48* (2013.01); *F16K 31/535* (2013.01); *F16K 31/602* (2013.01); *F16K 35/025* (2013.01)

(58) Field of Classification Search
CPC ........ F16K 1/24; F16K 31/602; F16K 35/025; F16K 1/48; F16K 31/535
(Continued)

(56) References Cited

U.S. PATENT DOCUMENTS 2,673,061 A * 3/1954 Broz .......................... F16K 1/24
                                                    251/163
2,892,609 A * 6/1959 Bibbo ....................... F16K 1/24
                                                    251/163
(Continued)

FOREIGN PATENT DOCUMENTS

CN          2184123          11/1994
CN         201053505          4/2008
(Continued)

OTHER PUBLICATIONS

International Search Report issued in International Application No. PCT/JP2016/077510 dated Dec. 13, 2016.
(Continued)

*Primary Examiner* — John Bastianelli
(74) *Attorney, Agent, or Firm* — DLA Piper LLP US

(57) ABSTRACT

A valve includes a housing defining therein a channel, a valve seat on an inner surface of the housing at a middle of the channel, a valve body member seated on and unseated from the valve seat to close and open the channel, and a stem spaced from the valve seat and rotatable around a first axis parallel with an opening surface of the valve seat. The valve body member and the stem respectively have a restricting hole and a restricting projection mutually slidably engageable to form a cam mechanism. The cam mechanism, in conjunction with rotation of the stem, reciprocates the valve body member between the seated position and the unseated position, and rotates the valve body member to be in a posture along a flow direction of a fluid flowing through the housing at the unseated position.

6 Claims, 11 Drawing Sheets

(51) Int. Cl.
*F16K 31/60* (2006.01)
*F16K 35/02* (2006.01)
*F16K 1/48* (2006.01)

(58) Field of Classification Search
USPC .................. 251/162–163, 215, 227
See application file for complete search history.

(56) References Cited

U.S. PATENT DOCUMENTS

| | | | | | |
|---|---|---|---|---|---|
| 2,919,885 | A | * | 1/1960 | Daigle | F16K 1/24 |
| | | | | | 251/161 |
| 2,934,310 | A | * | 4/1960 | Kinney | F16K 1/24 |
| | | | | | 251/163 |
| 3,498,583 | A | * | 3/1970 | Friedell | F16K 1/221 |
| | | | | | 251/162 |
| 3,531,083 | A | * | 9/1970 | Rohrer | F16K 1/228 |
| | | | | | 251/163 |
| 3,675,894 | A | * | 7/1972 | Friedell | F16K 5/204 |
| | | | | | 251/163 |
| 3,776,505 | A | * | 12/1973 | Nakanishi | F16K 1/24 |
| | | | | | 251/163 |
| 4,770,392 | A | * | 9/1988 | Schmidt | F16K 1/24 |
| | | | | | 251/158 |
| 4,817,916 | A | * | 4/1989 | Rawstron | F16K 1/24 |
| | | | | | 251/162 |
| 5,330,157 | A | * | 7/1994 | Dern | F16K 1/24 |
| | | | | | 251/162 |

| | | |
|---|---|---|
| 2003/0183796 | A1 | 10/2003 Crawley |

FOREIGN PATENT DOCUMENTS

| | | |
|---|---|---|
| CN | 102734478 | 10/2012 |
| CN | 103671954 | 3/2014 |
| JP | 53-004225 | 1/1978 |
| JP | 59-027573 | 8/1984 |
| JP | 08-338540 | 12/1996 |
| JP | 2001050401 A * | 2/2001 |
| JP | 2006-009855 | 1/2006 |

OTHER PUBLICATIONS

Written Opinion issued in International Application No. PCT/JP2016/077510 dated Dec. 13, 2016.
Office Action in CN Applicaion No. 201680057702 dated Feb. 22, 2019.
English-language Abstract of CN 2184123, published Nov. 30, 1994.
English-language Abstract of CN 201053505, published Apr. 30, 2008.
English-language Abstract of CN 103671954, published Mar. 26, 2014.
English-language Abstract of CN 102734478, published Oct. 17, 2012.

* cited by examiner

VALVE HAVING A STEM SPACED AWAY FROM A VALVE SEAT AND CONFIGURED TO ROTATE AROUND AN AXIS PARALLEL WITH AN OPENING SURFACE OF THE VALVE SEAT

CROSS REFERENCE TO RELATED APPLICATIONS

This application is a U.S. National Stage Application of International Application No. PCT/JP2016/077510 filed Sep. 16, 2016, which claims priority from Japanese Patent Application No. 2015-005023 filed Oct. 5, 2015. The entirety of all the above-listed applications are incorporated herein by reference.

TECHNICAL FIELD

The present invention relates to a valve for controlling supply of a fluid.

BACKGROUND ART

A known typical valve for controlling supply of a fluid is disclosed in, for instance, Patent Literature 1. This valve includes a valve seat, a valve body in the shape of a circular plate being seated on the valve seat to close a channel, an arm extending from a surface of valve body in a flow direction of the fluid, and a valve shaft extending in a direction orthogonal to the flow direction and connected to a distal end of the arm. The valve shaft of the valve is axially actuated by an air cylinder to rotate the valve body around the valve shaft, thereby opening and closing the channel. The valve shaft is eccentric to a straight line orthogonal to a center axis of the channel, so that the valve body is pressed hard against the valve seat to enhance sealing performance.

CITATION LIST

Patent Literature(s)

Patent Literature 1 JP 2006-9855 A

SUMMARY OF THE INVENTION

Problem(s) to be Solved by the Invention

The valve body of the valve of Patent Literature 1 gets seated or unseated through rotation around the valve shaft. Such rotation is, however, accompanied by the movement of the valve body with respect to the valve seat in a direction intersecting the center axis of the channel valve body with friction against the valve seat. The valve body and the valve seat thus get worn. Additionally, since the valve body is pressed hard against the valve seat, a contact surface of the valve body with the valve seat is likely to get worn quickly. The valve body and the valve seat thus have a poor durability.

An object of the invention is to provide a valve with an improved durability.

Means for Solving the Problem(s)

According to an aspect of the invention, a valve includes: a pair of first and second housings defining therein a channel and connected to each other; a valve seat provided to an end surface of the second housing orthogonal to a flow direction of a fluid flowing through the second housing; a valve body member configured to be moved between a seated position where the valve body member is seated on the valve seat and an unseated position where the valve body member is removed from the valve seat; a stem rotatably attached in a boss provided to a side surface of the first housing; and a reciprocation/rotation mechanism located between a lower end of the stem and the valve body member, in which the reciprocation/rotation mechanism is configured to, in conjunction with rotation of the stem, reciprocate the valve body member between the seated position and the unseated position, and rotate the valve body member to be in a posture along the flow direction at the unseated position.

The valve of the above aspect includes the reciprocation/rotation mechanism, which works in conjunction with the rotation of the stem to reciprocate the valve body member between the seated position and the unseated position relative to the valve seat almost without rotating the valve body member. The valve body member thus gets seated or unseated with almost no friction between the valve body member and the valve seat in a rotation direction, which results in improvement of the durability of each of the valve body member and the valve seat.

In the above aspect, it is preferable that the reciprocation/rotation mechanism is an eccentric cam mechanism.

The above arrangement employs the eccentric cam mechanism to provide a so-called eccentric valve, where the valve body member is pressed against the valve seat in conjunction with the rotation of the stem. The durability of each of the valve body member and the valve seat can thus be improved while a sealing performance, which is a feature of the eccentric valve, is maintained.

According to another aspect of the invention, a valve includes: a housing defining therein a channel; a valve seat provided to an inner surface of the housing at a middle of the channel; a valve body member configured to be seated on the valve seat to close the channel and unseated from the valve seat to open the channel; and a stem spaced away from the valve seat, the stem being configured to rotate around a first axis parallel with an opening surface provided to the valve seat, in which the valve body member includes a valve-body engagement portion and the stem includes a stem engagement portion, the valve-body engagement portion and the stem engagement portion being configured to be slidably engaged with each other to form a cam mechanism, and a rotation range of the stem includes: a first rotation range where the cam mechanism moves the valve body member in a direction substantially orthogonal to the opening surface of the valve seat while keeping the valve body member squarely facing the valve member; and a second rotation range where the valve-body engagement portion and the stem engagement portion are engaged to rotate the valve body member around the first axis by a predetermined angle.

The valve of the above aspect employs the cam mechanism, which allows the valve body member to move in a direction substantially orthogonal to the opening surface of the valve seat to be seated or unseated while being kept squarely facing the valve seat as the stem rotates within the first rotation range. Further, as the stem rotates within the second rotation range, the valve-body engagement portion and the stem engagement portion are engaged to rotate the valve body member around the first axis of the stem by a predetermined rotation angle. The valve body member thus retreats from the position squarely facing the valve seat to be fully opened or returns to the position facing the opening surface from the fully-opened state. In other words, especially, during the rotation within the first rotation range, the valve body member linearly moves in the direction substantially orthogonal to the opening surface almost without moving in the rotation direction around the first axis, e.g., moving in a retreating direction or returning from a retreat position. The valve body member thus gets seated or unseated almost without causing friction between the valve body member and the valve seat in the rotation direction of the stem, which results in improvement of the durability of each of the valve body member and the valve seat.

In the above aspect, it is preferable that the valve further includes a lever integrally connected to the stem at a part near a first end of the lever, and connected to the valve body member at a part near a second end of the lever such that the valve body member is rotatable around a second axis parallel with the first axis, in which a connection portion of the lever to the valve body member is the stem engagement portion and a connection portion of the valve body member to the lever is the valve-body engagement portion.

In the above arrangement, the rotation axis of the stem (first axis) and the rotation axis of the valve body member (second axis) are parallel with each other. In other words, the valve of the above arrangement is a so-called eccentric valve, where the valve body member is pressed by the lever. The durability of each of the valve body and the valve seat can thus be improved while a sealing performance, which is a feature of an eccentric valve, is maintained.

In the above aspect, it is preferable that the valve-body engagement portion and the stem engagement portion are a projection provided to one of the valve body member and the lever and a recess provided to the other one of the valve body member and the lever, the recess being configured to receive the projection such that the projection is rotatable around the second axis, and the projection and the recess define therebetween a space having a volume variable depending on relative rotation between the projection and the recess.

In the above arrangement, the space is formed between the valve-body engagement portion and the stem engagement portion in a circumferential direction around the first axis. The space has a volume variable depending on relative rotation of the recess and the projection such that the space disappears or the space having disappeared reappears and increases. When the volume of the space is variable, the valve body member is allowed to rotate with respect to the lever, achieving the rotation of the stem within the first rotation range and the linear movement of the valve body member. Further, when the space disappears or is maximized, the valve body member is allowed to rotate along with the lever, achieving the rotation of the stem within the second rotation range and the movement of the valve body member around the first axis in the rotation direction.

In the above aspect, it is preferable that the valve further includes a spring connected to the valve body member and the lever, the spring being configured to bias the valve body member in the seating direction as the stem rotates within the first rotation range.

The above arrangement employs the spring, which biases the valve body member in the seating direction. As the stem rotates within the first rotation range to unseat the valve body member from the valve seat via the lever, a reaction force of a spring force of the spring acts on the valve body member, which is moving while being kept squarely facing the valve seat, in a direction for assisting the rotation of the lever. Thus, if a flow of the fluid through the channel in the housing becomes a resistance to the movement of the valve body member in the unseating direction, the reaction force would allow the lever to smoothly rotate against the resistance.

In the above aspect, it is preferable that the valve further includes a guide provided to the inner surface of the housing, the guide being configured to come into contact with the valve body member to stop rotation of the valve body member around the first axis and to guide the valve body member having been in contact with the guide toward the valve seat.

The above arrangement employs the guide, which stops the rotation of the valve body member around the first axis and guides the valve body member toward the valve seat to close the valve. The valve body member can thus be appropriately seated.

In the above aspect, it is preferable that the valve further includes a stop configured to determine the rotation range of the stem.

The above arrangement employs the stop, which determines the rotation range of the stem. The valve body member can thus be reliably stopped at a position corresponding to each of the start point and end point of the rotation range of the stem.

In the above aspect, it is preferable that the valve further includes an actuator configured to drive the stem.

The above arrangement employs the actuator for driving the stem. The valve of the above arrangement can thus be usable at a position or in an environment where the valve cannot be manually operated, or in a fully automatic line.

BRIEF DESCRIPTION OF DRAWING(S)

FIG. 6 is a horizontal sectional view of the valve according to the exemplary embodiment, showing the valve in the opened state for letting the fluid through.

DESCRIPTION OF EMBODIMENT(S)

Figure 1:
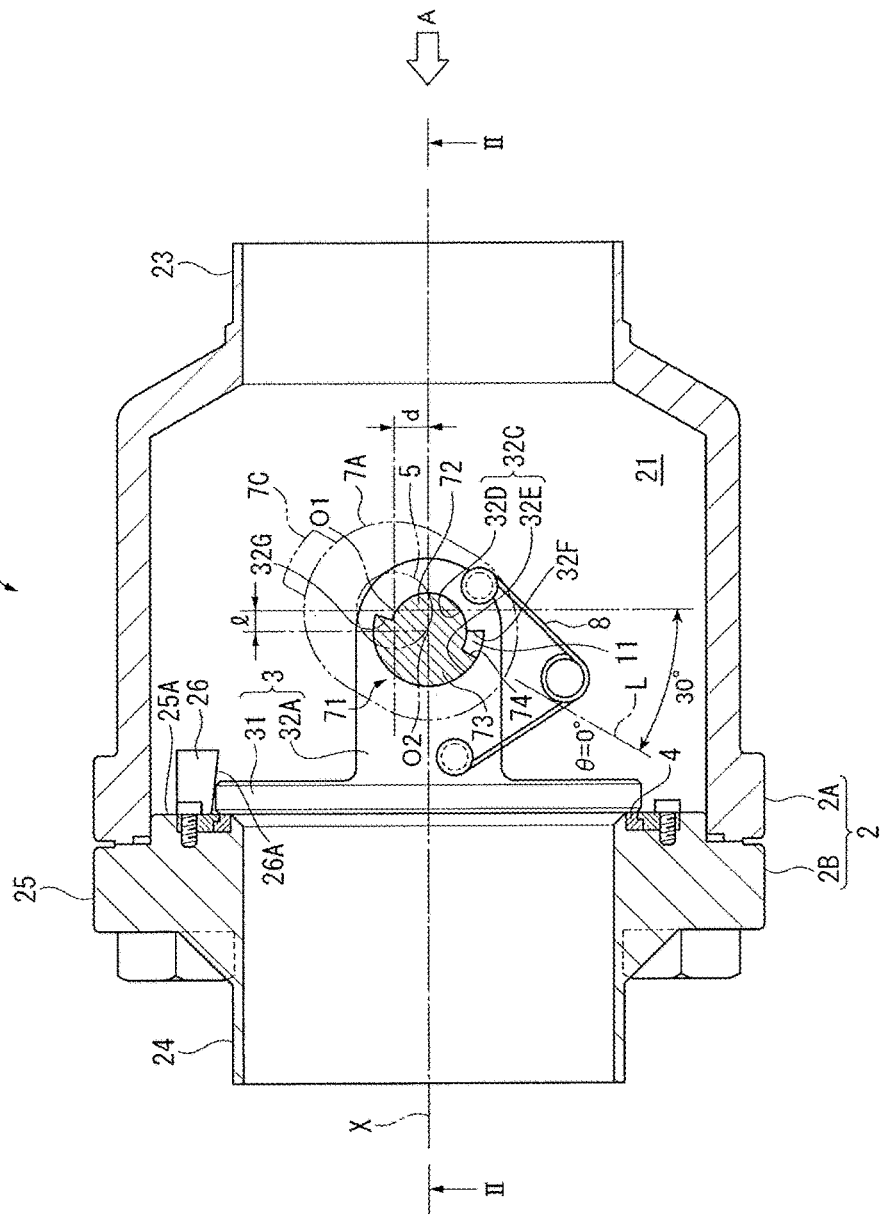
FIG. 1 is a horizontal sectional view of a valve according to an exemplary embodiment of the invention, showing the valve in a closed state for blocking a fluid.
Figure 2:
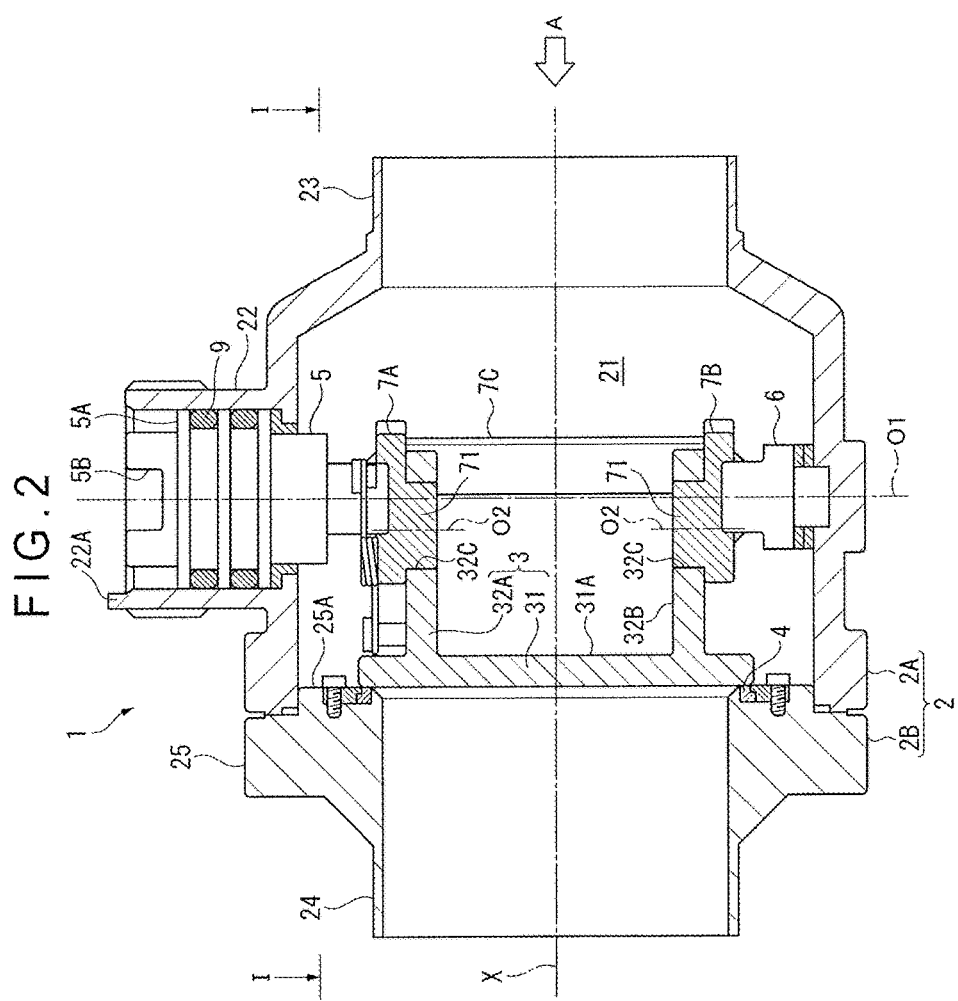
FIG. 2 is an elevational sectional view of the valve according to the exemplary embodiment, showing the closed state.

A valve 1 according to an exemplary embodiment of the invention will be described with reference to FIGS. 1 and 2. FIGS. 1 and 2 show a "closed state" for blocking a fluid. In the figures, an arrow A shows a flow direction of the fluid, and a straight line denoted by a reference sign X shows an axis passing through a center of a valve body member 3 in the closed state in parallel with a channel. It should be noted that the axis X also shows a center of the channel in the exemplary embodiment. In the description below, a "right-left direction" means a direction orthogonal to the axis X, and a "top-bottom direction" means a direction orthogonal to the axis X and the right-left direction.

Description of Structure of Valve

Valve

The valve 1, which is configured to control supply of a fluid flowing in a direction shown by the arrow A, includes: a housing 2 defining therein a channel 21; the valve body member 3 accommodated in the housing 2 to open and close the channel 21; a valve seat 4 for the valve body member 3 to be seated/unseated, the valve seat 4 being provided to an inner surface of the housing 2 at a middle of the channel 21; a stem 5 spaced upstream from the valve seat 4 and configured to rotate around a first axis O1 parallel with an opening surface provided to the valve seat 4; a driven shaft 6 located at a lower side on the first axis O1; a pair of levers 7A, 7B respectively provided on a lower end of the stem 5 and on an upper end of the driven shaft 6; and a spring, namely a helical torsion spring 8.

Housing

The housing 2, which includes an upstream first housing 2A and a downstream second housing 2B, is made of a material such as a cast metal or a pipe material.

The first housing 2A, which is cylindrical, includes an inlet for the fluid, namely an inflow pipe 23, and a boss 22 provided to a side wall thereof. The stem 5 is inserted in the boss 22 with a seal member 9 being interposed therebetween. The boss 22 has an upper end provided with a stop 22A configured to determine a rotation range of the stem 5 upon coming into contact with an operation handle, the stop 22A projecting at a position corresponding to each of start point and end point of the rotation range. In the exemplary embodiment, a maximum rotation range of the stem 5 is determined to be 120 degrees by the stop 22A.

The second housing 2B, which is continuously connected to a downstream side of the first housing 2A, includes an outlet for the fluid, namely an outflow pipe 24, and a flange 25 bolted to the first housing 2A. The later-described valve seat 4 is provided on an upstream end surface 25A of the flange 25. A guide 26 is provided at an upstream side of the valve seat 4. The guide 26, which is a member in the shape of a rectangular column extending upstream from the end surface 25A, has a side surface facing a valve body 31 and serving as a smooth guide surface 26A. The guide surface 26A is a slant surface that is more distant from a vertical plane including the axis X at a further downstream side.

Valve Body Member

The valve body member 3 includes the valve body 31 in the shape of a circular plate, and a pair of arms 32A, 32B vertically arranged side by side and extending from a rear surface 31A of the valve body 31. The pair of arms 32A, 32B are parallel with each other along a direction shown by the axis X.

Figure 3:
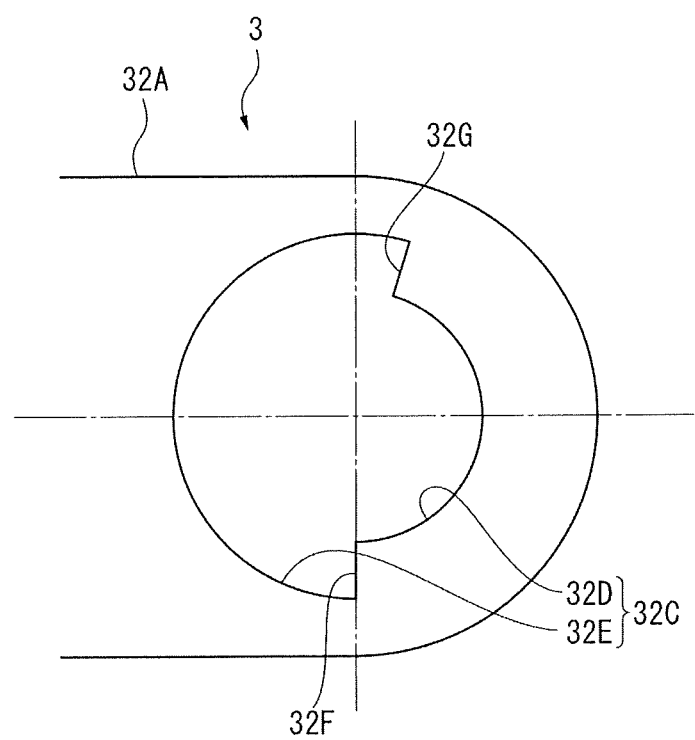
FIG. 3 is an enlarged view showing a restricting hole of an arm.

The arms 32A, 32B each have a distal end provided with a restricting hole 32C, which is a part of a cam mechanism according to the invention, i.e., a recess serving as a valve-body engagement portion. FIG. 3 is a plan view showing the restricting hole 32C of the upper arm 32A as seen from above (from the same point of sight as in FIG. 1). The restricting hole 32C includes a round portion 32D and a fan-shaped hole 32E provided to a part of a periphery of the round portion 32D. The fan-shaped hole 32E has a center angle larger than that of a later-described fan-shaped portion 73.

Valve Seat

The valve seat 4, which is ring-shaped, is fitted in a groove provided to the upstream end surface 25A of the second housing 2B. The valve seat 4 is made of a metal material usually used for typical valves.

Stem

The stem 5 has a body provided with a plurality of collars 5A in tiers. The seal member 9 is attached between vertically adjacent ones of the collars 5A. An upper end of the stem 5 is provided with an insertion hole 5B for receiving an operation handle (not shown) by cutting. As shown in FIG. 1, a rotation axis of the stem 5, i.e., the first axis O1, is eccentric upward to the axis X by a predetermined amount d (e.g., 5 mm) in FIG. 1.

Driven Shaft

The driven shaft 6 has a lower end pivotably supported by an inner wall of the first housing 2A. A rotation axis of the driven shaft 6 is in alignment with the first axis O1 in the same manner as the stem 5.

Levers

The pair of levers 7A, 7B are each in an oblong shape having an axis L along a longitudinal direction. The upper lever 7A is integrally connected to the stem 5, which is brought from above, at a part near a first end in the longitudinal direction by welding or the like. The lower lever 7B is integrally connected to the driven shaft 6, which is brought from below, at a part near a first end in the longitudinal direction by welding or the like. The first ends of the levers 7A, 7B are connected to each other by a vertical connector 7C.

A surface of the lever 7A facing the arm 32A at a part near a second end in the longitudinal direction is provided with a projection serving as a stem engagement portion, i.e., a restricting projection 71, which projects toward the restricting hole 32C. A surface of the lever 7B facing the arm 32B at a part near a second end in the longitudinal direction is similarly provided with another restricting projection 71. The restricting projections 71 are each received in the restricting hole 32C of the corresponding one of the arms 32A, 32B and rotatable around a second axis O2. Thus, the levers 7A, 7B are each connected to the corresponding one of the arms 32A, 32B via the restricting projection 71 and the restricting hole 32C, thereby connecting the stem 5 to the valve body member 3.

Consequently, in the exemplary embodiment, the levers 7A, 7B, which are connected to each other not only by the connector 7C but also via the valve body member 3, simultaneously rotate with the rotation of the stem 5. Further, each of the restricting projections 71 and the corresponding restricting hole 32C in combination serve as a reciprocation/rotation mechanism according to the invention, i.e., the cam mechanism (eccentric cam mechanism). The cam mechanism works in conjunction with the rotation of the stem 5, allowing the valve body member 3 to move between a seated position and an unseated position relative to the valve seat 4 and rotate to the unseated position or a position along the direction shown by the arrow A. The shape of the restricting holes 32C is described above with reference to FIG. 3. A specific shape of the restricting projections 71 will be described below.

Figure 4:
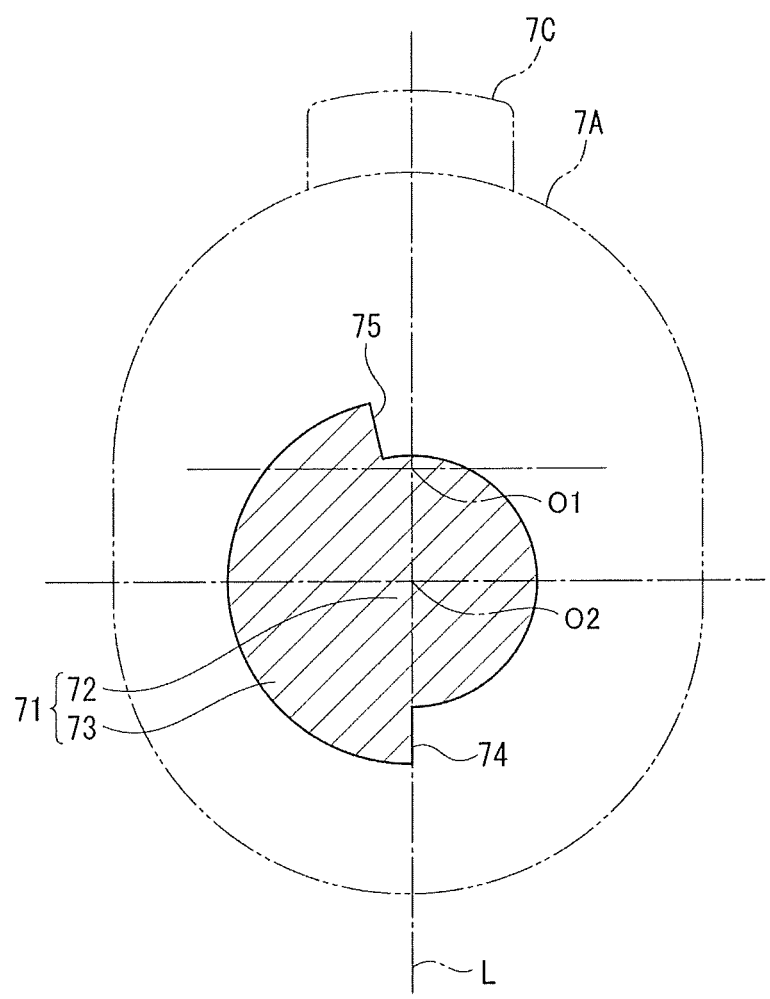
FIG. 4 is an enlarged view showing a restricting projection of a lever.

FIG. 4 is a plan view showing the lever 7A as seen from above (from the same point of sight as in FIG. 1). Regarding FIG. 4, it should be noted that the restricting projection 71, which is provided to a lower surface of the lever 7A and hidden by the presence of a body of the lever 7A, is shown by a solid line and an outline of each of the lever 7A and the connector 7C is shown by a chain double-dashed line for the purpose of clearly illustrating the restricting projection 71, although the restricting projection 71 should have been shown by a dashed line.

The restricting projection 71 includes a shaft 72 having the same diameter as that of the round portion 32D of the restricting hole 32C shown in FIG. 3, and a fan-shaped portion 73 provided to a part of a periphery of the shaft 72 and having a shape matching that of the fan-shaped hole 32E of the restricting hole 32C. The restricting projection 71 is fitted in the restricting hole 32C and rotatable around the second axis O2. In other words, a rotation axis of the shaft 72 is in alignment with the second axis O2. The second axis O2 is parallel with the first axis O1 at a distance.

Helical Torsion Spring

The helical torsion spring 8, which is connected to the arm 32A of the valve body member 3 and the lever 7A, biases the valve body member 3 in a seating direction during rotation within a later-described first rotation range. In other words, the helical torsion spring 8 is configured to reduce an arm angle when twisted in the "closed state" and have a free arm angle in later-described "intermediate state" and "opened state."

Description of Opening Operation of Valve

First, description will be made on an opening operation for moving the valve 1 from the "closed state" shown in FIG. 1 to the "opened state" shown in FIG. 6. It should be noted that the lever 7B, which operates in the same manner as the lever 7A, is not described below, since the operation of the lever 7B should be understandable from the description of the lever 7A with reference to the figures.

In the closed state shown in FIG. 1, the valve body member 3 is seated on the valve seat 4, and the lever 7A is tilted clockwise by 30 degrees from a plane vertical to the axis X with reference to the axis L along the longitudinal direction. The above position is achieved when a rotation angle of the stem 5 is zero (rotation angle θ=0 degrees). At this time, the second axis O2 is distant from the first axis O1 toward the valve seat 4 by a predetermined amount 1 (e.g., 3 mm). Incidentally, a circumferential first space 11 (see FIG. 1) is defined between a wall 32F of the fan-shaped hole 32E of the restricting hole 32C, which faces against the clockwise direction, and an end surface 74 of the fan-shaped portion 73 of the restricting projection 71, which faces against the anticlockwise direction. The first space 11 has a volume variable depending on relative rotation of the restricting projection 71 and the restricting hole 32C.

Figure 5:
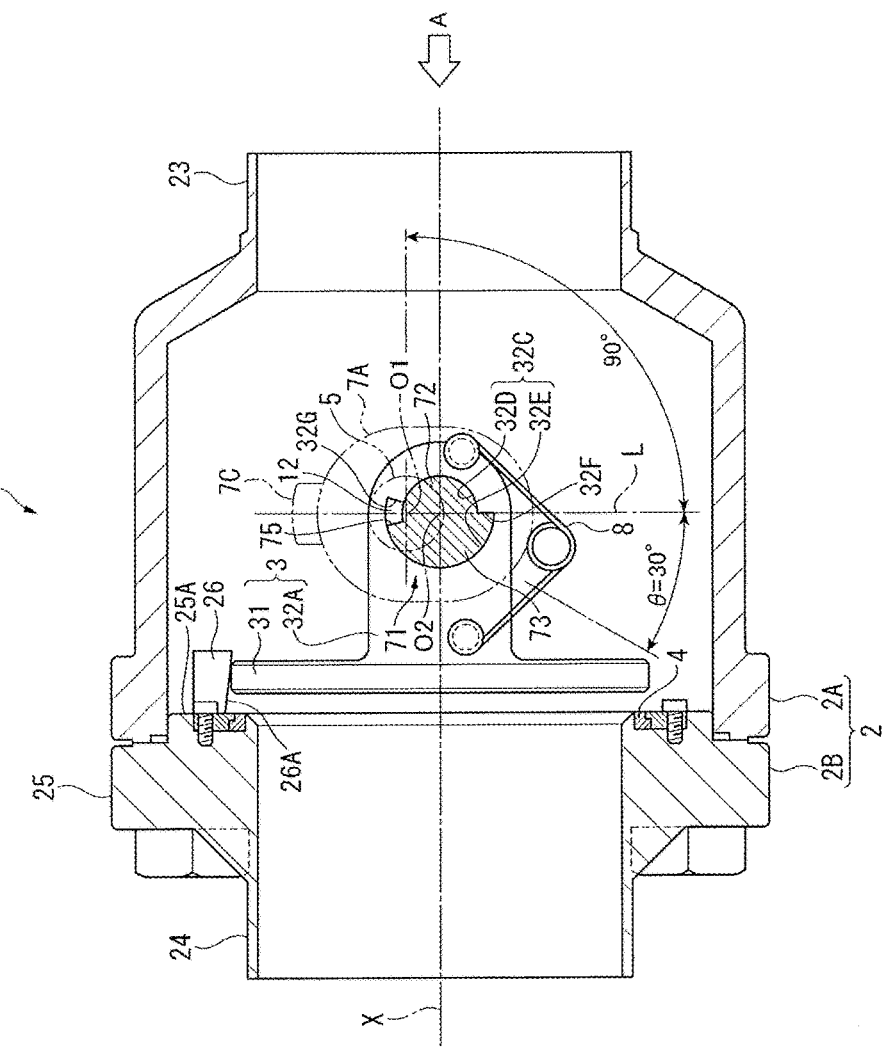
FIG. 5 is a horizontal sectional view of the valve according to the exemplary embodiment, showing an intermediate state between the closed state and an opened state.

In the closed state of the valve 1, as the stem 5 is rotated in the anticlockwise direction in FIG. 1 by 30 degrees (rotation angle θ=30 degrees) using the operation handle set on the stem 5, the lever 7A rotates around the first axis O1 along with the stem 5. The restricting projection 71 thus presses an inner wall of the round portion 32D of the restricting hole 32C, so that the valve body member 3 is substantially linearly translated in a direction substantially orthogonal to the opening surface of the valve seat 4 (i.e., an unseating direction away from the vale seat 4) by the cam mechanism while being kept squarely facing the valve seat 4 almost without being moved in a rotation direction of the lever 7A around the first axis O1 by the cam mechanism. Simultaneously, the restricting projection 71 slides in the restricting hole 32C while reducing the first space 11. The end surface 74 of the restricting projection 71 then comes into engagement with the wall 32F of the restricting hole 32C, and the first space 11 disappears. The valve 1 is thus set in the intermediate state shown in FIG. 5. The above rotation range from 0 to 30 degrees (from the "closed state" to the "intermediate state") is referred to as the first rotation range.

In the intermediate state, the valve body member 3 still squarely faces the valve seat 4 in the same manner as in the closed state, although the valve body member 3 is separated from the valve seat 4. The axis L of the lever 7A is orthogonal to the axis X at this time. A second space 12 (see FIG. 5) is formed between a wall 32G of the fan-shaped hole 32E and an end surface 75 of the fan-shaped portion 73 of the restricting projection 71 as the first space 11 disappears, the wall 32G facing against the anticlockwise direction, the end surface 75 facing against the clockwise direction.

In the intermediate state of the valve 1, further rotation of the stem 5 causes the stem 5, the lever 7A and the valve body member 3 to rotate together around the first axis O1, since the first space 11 has disappeared. In the exemplary embodiment, the stem 5 is rotated by 90 degrees (rotation angle θ=120 degrees) until the operation handle reaches the stop 22A at an end point. The valve body member 3 thus moves and retreats in the rotation direction to be fully opened (i.e., the "opened state" shown in FIG. 6). The above rotation range from 30 to 120 degrees (from the "intermediate state" to the "opened state") is referred to as a second rotation range.

In the opened state, the valve body 31 of the valve body member 3 and the axis L of the lever 7A are parallel with the axis X, and the second space 12 appears in place of the first space 11.

Description of Closing Operation of Valve

Figure 6:
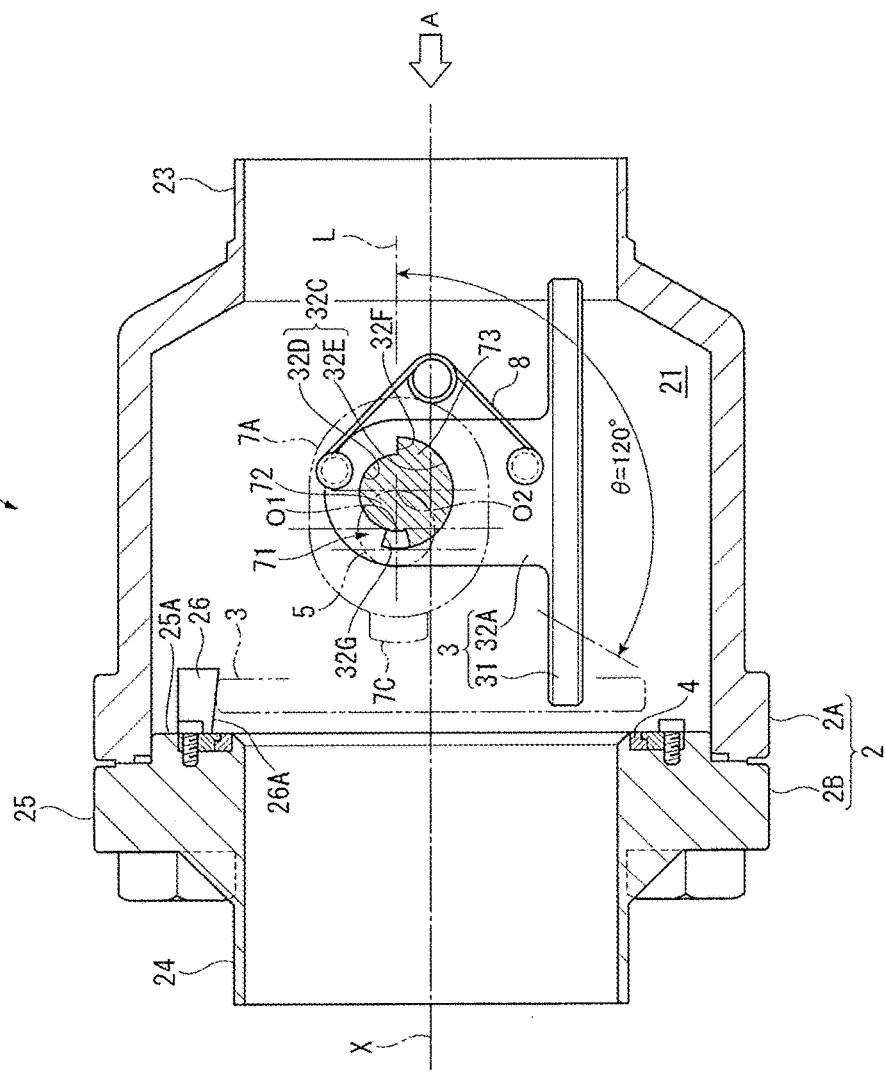

In the opened state of the valve 1, when the stem 5 is returned by 90 degrees (rotation angle θ=30 degrees) in the clockwise direction in FIG. 6, the stem 5, the lever 7A and the valve body member 3 rotate together without causing the restricting projection 71 to slide in the restricting hole 32C. The valve body member 3 is then brought into contact with the guide 26 to stop rotating, thus returning to the "intermediate state" to squarely face the valve seat 4. Since the valve body member 3 rotates along with the lever 7A until returning to the "intermediate state", the second space 12 is left without disappearing.

Further rotation of the stem 5 from the intermediate state by the first rotation range or 30 degrees (rotation angle θ=0 degrees) causes the restricting projection 71 to slide in the restricting hole 32C while reducing the second space 12. The end surface 75 of the restricting projection 71 then comes into engagement with the wall 32G of the fan-shaped hole 32E, and the second space 12 disappears (rotation angle: 0 degrees). The "closed state" shown in FIG. 1 is thus achieved. During the above process, the valve body member 3, which is squarely kept facing the valve seat 4, is guided by the guide surface 26A of the guide 26 to linearly translate in a direction substantially orthogonal to the opening surface of the valve seat 4 (i.e., the seating direction toward the valve seat 4) until seated on the valve seat 4 almost without being moved in the rotation direction of the lever 7A around the first axis O1.

Advantage(s) of Exemplary Embodiment(s)

The valve 1 employs the cam mechanism, which allows the valve body member 3 to move in the direction substantially orthogonal to the opening surface of the valve seat 4 while being kept squarely facing the valve seat 4 as the stem 5 rotates within the first rotation range (0 to 30 degrees). This reduces a displacement of the valve body member 3 in this direction and, consequently, the valve body member 31 gets seated and unseated with almost no friction between the valve body member 31 and the valve seat 4 in this direction. The durability of each of the valve body 31 and the valve seat 4 can thus be improved.

Since no friction occurs between the valve body 31 and the valve seat 4, the fluid is free from dust resulting from wear of the valve body 31 and the valve seat 4. The clean level of the fluid can thus be maintained.

The valve 1 is a so-called eccentric valve, and the valve body 31 is pressed by the levers 7A, 7B. The durability of each of the valve body 31 and the valve seat 4 can thus be improved, while a sealing performance, which is a feature of an eccentric valve, is maintained.

The restricting projection 71 comes into engagement with one of the wall 32F and the wall 32G of the restricting hole 32C not to be further movable, restricting the rotation of the valve body member 3. The rotation of the valve body member 3 can thus be reliably restricted irrespective of repeating use.

The exemplary embodiment uses a change in the volume of each of the first and second spaces 11, 12 to restrict the rotation of the valve body member 3. When the volume of the first and second spaces 11, 12 is variable, the valve body member 3 is rotatable with respect to the levers 7A, 7B, thus allowing the rotation of the stem 5 within the first rotation range and the linear movement of the valve body member 3. Further, when the first space 11 disappears and the second space 12 is maximized, the valve body member 3 is rotatable along with the levers 7A, 7B, thus allowing the rotation of the stem 5 within the second rotation range and the movement of the valve body member 3 around the first axis in the rotation direction.

The helical torsion spring 8 biases the valve body member 3 in the seating direction. Thus, in unseating the valve body member 3 from the valve seat 4 via the levers 7A, 7B by the rotation within the first rotation range, a reaction force of a spring force of the helical torsion spring 8 acts on the valve body member 3, which is moving while being kept squarely facing the valve seat 4, in a direction for assisting the rotation of each of the levers 7A, 7B. If a flow of the fluid through the channel 21 in the housing 2 becomes a resistance to the movement of the valve body member 3 in the unseating direction, the reaction force would allow the levers 7A, 7B to smoothly rotate against the resistance.

The stop 22A, which determines the rotation range of the stem 5, allows the valve body member 3 to reliably stop at a position corresponding to each of the start point and end point of the rotation range of the stem 5.

Modification(s)

The valve is not necessarily embodied in the form of the valve 1 of the above exemplary embodiment and can be modified or improved within the scope of the invention.

Figure 7:
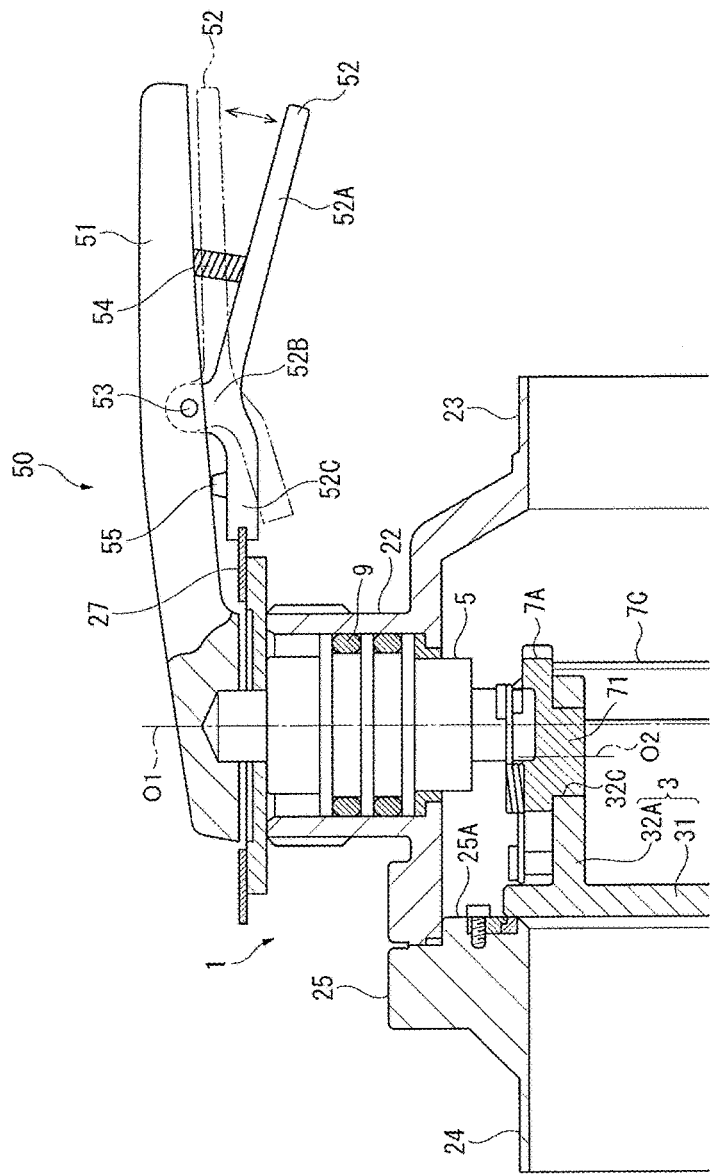
FIG. 7 is an elevational sectional view of an operation handle equipped with a lock mechanism.

The valve 1 of the exemplary embodiment employs the stop 22A provided to the boss 22 of the first housing 2A (see FIG. 2) to determine the rotation range of the stem 5. However, an operation handle 50 with a lock mechanism shown in FIGS. 7 and 8 may be employed in place of the stop 22A to determine the rotation range of the stem 5 and, further, to immobilize the stem 5 at a predetermined position.

Figure 8:
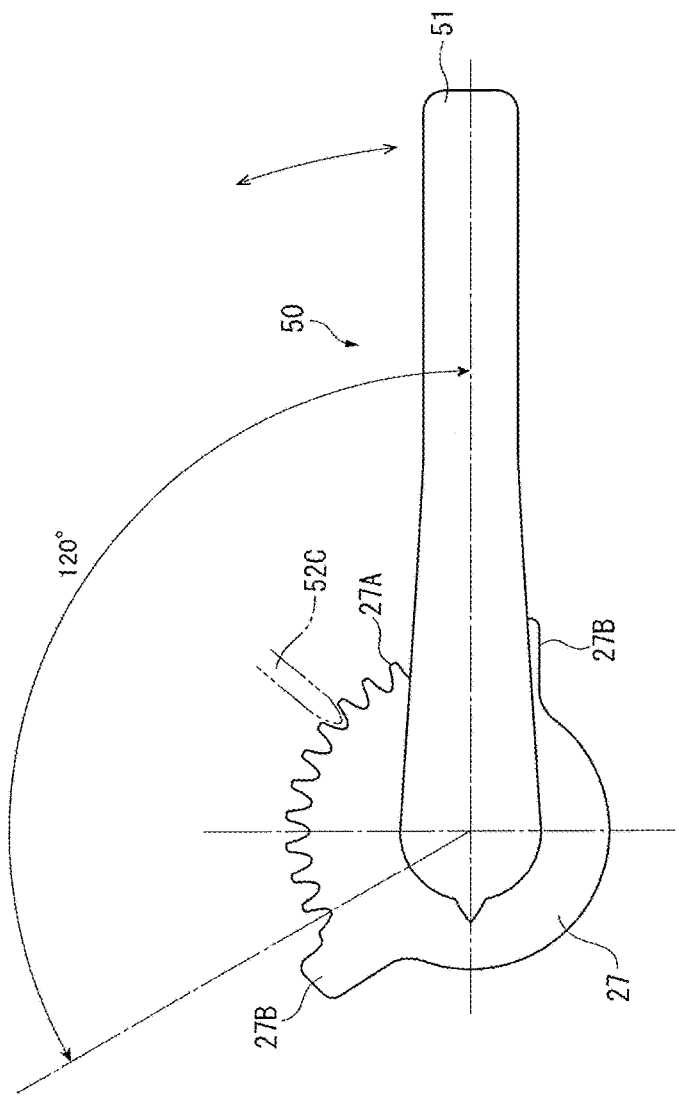
FIG. 8 is a plan view of the operation handle equipped with the lock mechanism.

The operation handle 50 includes a rotation lever 51 extending in a radial direction of the stem 5 and configured to rotate along with the stem 5, a vertically movable lever 52 provided to a lower side of the rotation lever 51 and rotatable with respect to the rotation lever 51, a pin 53 connecting the vertically movable lever 52 to the rotation lever 51 in a manner rotatable with each other, and components such as a coil spring 54 and a stop 55 located between the rotation lever 51 and the vertically movable lever 52. The vertically movable lever 52 includes an operation member 52A configured to be vertically moved by a user, a supporting point 52B receiving the pin 53, and a distal end 52C configured to mesh with a toothed plate 27 concentrically attached to a tip end of the boss 22. The toothed plate 27, which is a component in the shape of a circular plate, is partly provided with a plurality of teeth 27A configured to mesh with the distal end 52C over a range of 120 degrees corresponding to the rotation range of the stem as shown in FIG. 8. Stops 27B are provided to both ends of a sequence of the plurality of teeth 27A. The distal end 52C comes into contact with each of the stops 27B to determine a rotation range of the operation handle 50.

When the operation member 52A of the vertically movable lever 52 is not held, the distal end 52C is raised by a biasing force of the coil spring 54 until the stop 55 comes into contact. The distal end 52C thus meshes with the teeth 27A of the toothed plate 27 to prevent the rotation of the operation handle 50. When a user holds the operation member 52A in the above state, the distal end 52C is separated downward from the teeth 27A and the operation handle 50 becomes rotatable.

The above arrangement can determine the rotation range of the operation handle 50. Further, the distal end 52C meshes with the teeth 27A to fix a rotation position of the operation handle 50. Thus, if a pressure of the fluid biases the valve body 31 in the closed state in a direction for opening or biases the valve body 31 in the opened state in a direction for closing, the movement of the valve body 31 would be prevented to reliably maintain the opened state or the closed state. The above arrangement also allows the valve body 31 to be immobilized at a predetermined position to control the flow rate.

Figure 9:
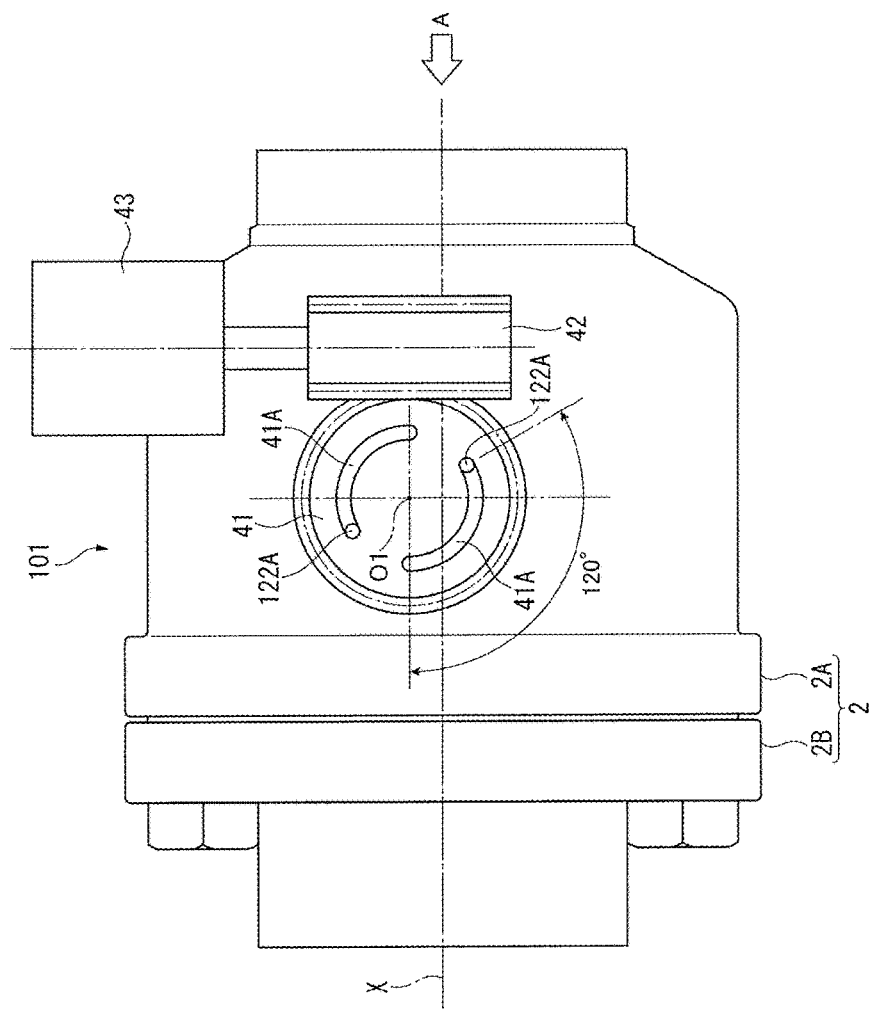
FIG. 9 is a plan view of a valve according to a modification of the invention.

A valve 101 according to a modification shown in FIG. 9 employs a motor as an actuator to rotate the stem 5, although the stem 5 of the valve 1 is rotated using the operation handle. An inner structure of the valve 101 is the same as that of the valve 1 and thus not described here.

A worm wheel 41 is fixed on the upper end of the stem 5. The worm wheel 41 meshes with a worm gear 42 extending in a direction intersecting the stem 5. The worm gear 42 is attached to a rotary shaft of a servomotor 43 (actuator) so that a rotary driving force from the servomotor 43 is transferred to the stem 5. It should be noted that the actuator may be, for instance, an air cylinder in place of the servomotor. Further, the worm gear 42 may be manually rotated using an operation handle to rotate the worm wheel 41.

The worm wheel 41 is provided with a pair of circumferential slits 41A with a center angle of 120 degrees. The slits 41A receive upper ends of a pair of stop pins 122A symmetric with respect to the first axis O1. The stop pins 122A project from the upper end of the boss 22. In the valve 101, the rotation range of the stem 5 is determined by both software approach and hardware approach, such as the position control by the servomotor 43 and the use of the stop pins 122A. Further, the mechanism using the worm gear 42 prevents transfer of rotation from the worm wheel 41 to the worm gear 42 irrespective of whether the rotation is automatically or manually caused, so that the rotation position of the stem 5 can be fixed.

In each of the valves 1, 101, the guide 26 is a member provided to the end surface 25A of the flange 25 of the second housing 2B and extending upstream, but may, alternatively, be a member provided to an inner circumferential surface of the first housing 2A and extending inward. The location and shape of the guide 26 may be changed as appropriate.

In each of the valves 1, 101 of the exemplary embodiment, the rotation of the valve body member 3 relative to the lever 7A is restricted by bringing the fan-shaped portion 73 (the projection) into contact with one of the walls 32F, 32G of the fan-shaped hole 32E (the recess), but may be restricted in a different way. For instance, the rotation may be restricted by bringing the fan-shaped portion 73 into contact with a projection projecting inward from a circumferential wall of the fan-shaped hole 32E (i.e., bringing projections into contact with each other). Alternatively, a wire extending in the rotation direction may be provided between the lever 7A and the valve body member 3 so that the rotation is restricted when the wire is strained. Further, a braking device may be provided to one of the lever 7A and the valve body member 3 to apply a brake to the other one of the lever 7A and the valve body member 3 so that the rotation is restricted by a braking operation of the braking device.

Figure 10:
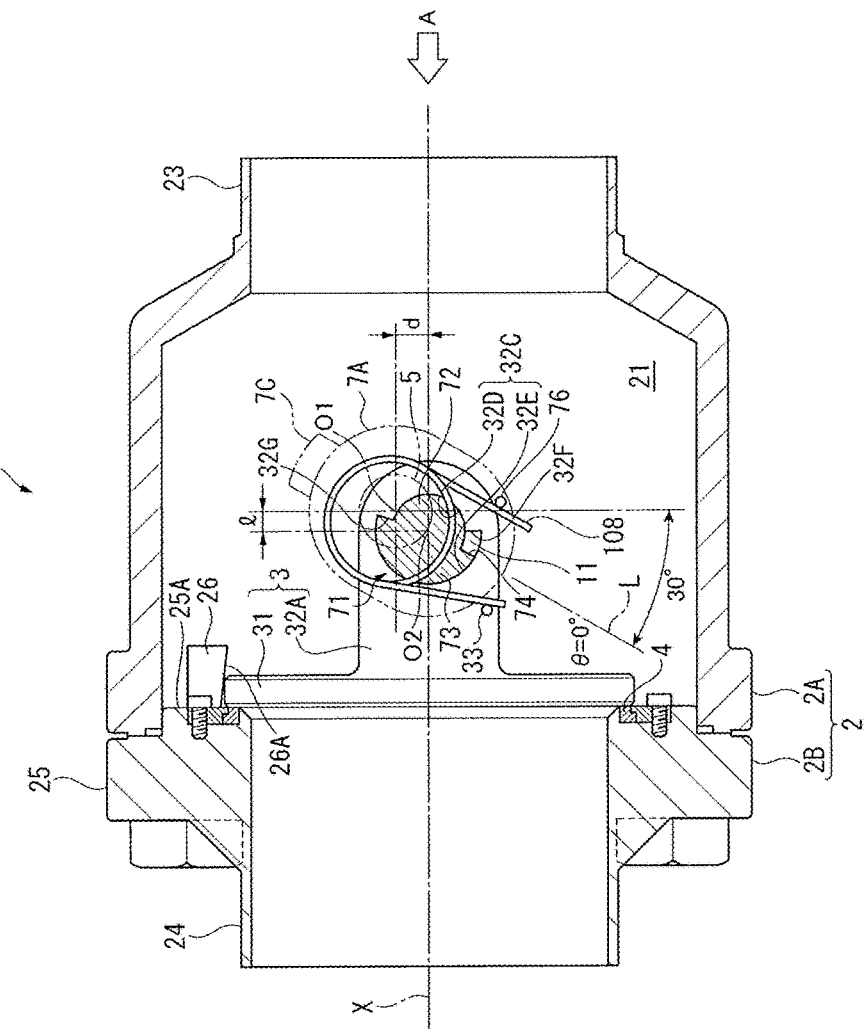
FIG. 10 is a horizontal sectional view of a valve attached with a helical torsion spring according to another modification, showing the closed state.
Figure 11:
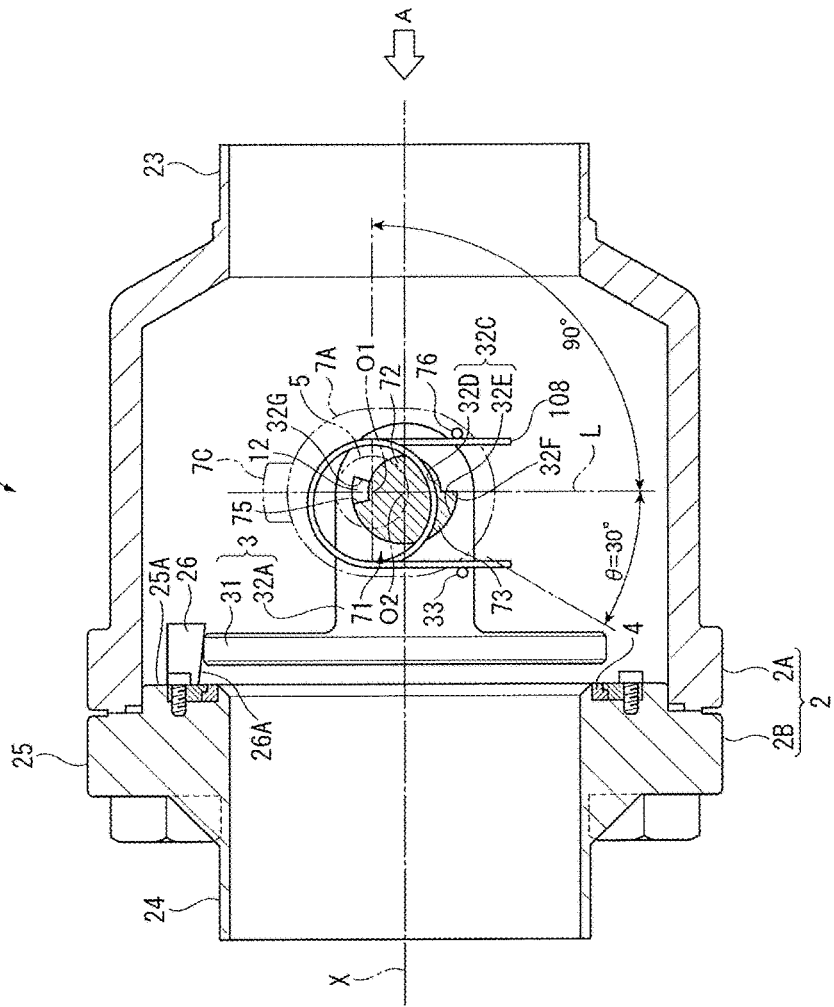
FIG. 11 is a horizontal sectional view of the valve attached with the helical torsion spring according to the modification, showing the intermediate state.

The valves 1, 101 each employ the helical torsion spring 8 shown in, for instance, FIG. 1 as the spring of the present invention, but may employ a helical torsion spring 108 shown in FIGS. 10 and 11. FIG. 10 shows the "closed state" and FIG. 11 shows the "intermediate state." The helical torsion spring 108, which is configured to bias the valve body member 3 in the seating direction in the same manner as the helical torsion spring 8, includes a coil receiving therein the stem 5, a first arm having an end held on a pin 33 projecting from the arm 32A, and a second arm having an end held on a pin 76 projecting from the lower surface of the lever 7A. The helical torsion spring 108 is twisted in the "closed state" with a reduced arm angle. It should be noted that a rubber material may be used in place of the helical torsion springs 8, 108.

Each of the valves 1, 101 of the exemplary embodiment is a valve for receiving a one-way flow of a fluid in the direction shown by the arrow A, but may be a valve for receiving bi-directional flows of a fluid in the direction shown by the arrow A and the opposite direction.

The invention claimed is:

1. A valve comprising:
a housing defining therein a channel;
a valve seat disposed adjacent to an inner surface of the housing at a middle of the channel;
a valve body member configured to be seated on the valve seat to close the channel and unseated from the valve seat to open the channel; and
a stem spaced away from the valve seat, the stem being configured to rotate around a first axis parallel with an opening surface of the valve seat, wherein
the valve body member comprises a valve-body engagement portion and the stem comprises a stem engagement portion, the valve-body engagement portion and the stem engagement portion being configured to be slidably engaged with each other to form a cam mechanism,
the valve further comprising a lever integrally connected to the stem at a part near a first end of the lever, and connected to the valve body member at a part near a second end of the lever such that the valve body member is rotatable around a second axis parallel with the first axis, wherein the lever comprises the stem engagement portion connecting to the valve body member and the valve body member comprises the valve-body engagement portion connecting to the lever, and
a rotation range of the stem comprises:
a first rotation range where the cam mechanism moves the valve body member in a direction substantially orthogonal to the opening surface of the valve seat while keeping the valve body member squarely facing the valve seat; and
a second rotation range where the valve-body engagement portion and the stem engagement portion are engaged to rotate the valve body member around the first axis by a predetermined angle.

2. The valve according to claim 1, wherein
the valve-body engagement portion and the stem engagement portion include a projection on one of the valve body member and the lever and a recess on the other one of the valve body member and the lever, the recess being configured to receive the projection such that the projection is rotatable around the second axis, and
the projection and the recess define therebetween a space having a volume variable depending on relative rotation between the projection and the recess.

3. The valve according to claim 1, further comprising a spring connected to the valve body member and the lever, the spring being configured to bias the valve body member in the seating direction as the stem rotates within the first rotation range.

4. The valve according to claim 1, further comprising a stop configured to determine the rotation range of the stem.

5. The valve according to claim 1, further comprising an actuator configured to drive the stem.

6. A valve comprising:
a housing defining therein a channel;
a valve seat disposed adjacent to an inner surface of the housing at a middle of the channel;
a valve body member configured to be seated on the valve seat to close the channel and unseated from the valve seat to open the channel;
a stem spaced away from the valve seat, the stem being configured to rotate around a first axis parallel with an opening surface of the valve seat; and
a guide on the inner surface of the housing, the guide being configured to come into contact with the valve body member to stop rotation of the valve body member around the first axis and to guide the valve body member having been in contact with the guide toward the valve seat, wherein
the valve body member comprises a valve-body engagement portion and the stem comprises a stem engagement portion, the valve-body engagement portion and the stem engagement portion being configured to be slidably engaged with each other to form a cam mechanism, and
a rotation range of the stem comprises:
a first rotation range where the cam mechanism moves the valve body member in a direction substantially orthogonal to the opening surface of the valve seat while keeping the valve body member squarely facing the valve seat; and
a second rotation range where the valve-body engagement portion and the stem engagement portion are engaged to rotate the valve body member around the first axis by a predetermined angle.

* * * * *